(12) United States Patent
Sakurai et al.

(10) Patent No.: US 7,646,794 B2
(45) Date of Patent: Jan. 12, 2010

(54) LASER APPARATUS AND MANUFACTURING METHOD OF A BATTERY

(75) Inventors: Tsutomu Sakurai, Nara (JP); Koji Funami, Kyoto (JP)

(73) Assignee: Panasonic Corporation, Osaka (JP)

( * ) Notice: Subject to any disclaimer, the term of this patent is extended or adjusted under 35 U.S.C. 154(b) by 10 days.

(21) Appl. No.: 12/102,135

(22) Filed: Apr. 14, 2008

(65) Prior Publication Data

US 2008/0253410 A1    Oct. 16, 2008

(30) Foreign Application Priority Data

Apr. 16, 2007    (JP) ............................... 2007-106628

(51) Int. Cl.
*H01S 3/10*    (2006.01)
(52) U.S. Cl. .................... 372/25; 372/38.02; 372/38.03; 372/38.08; 219/121.76; 29/623.2
(58) Field of Classification Search .............. 372/38.02, 372/25, 38.05, 38.08; 219/121.76, 121.67; 29/623.2
See application file for complete search history.

(56) References Cited

U.S. PATENT DOCUMENTS 5,331,234 A * 7/1994 Merritt et al. ............... 327/438
2006/0207085 A1* 9/2006 Nakagawa et al. ......... 29/623.1

FOREIGN PATENT DOCUMENTS

JP    2004337881 A * 12/2004

* cited by examiner

*Primary Examiner*—Minsun Harvey
*Assistant Examiner*—Michael Carter
(74) *Attorney, Agent, or Firm*—Steptoe & Johnson LLP

(57) ABSTRACT

A laser apparatus is provided which is capable of achieving deep penetration into an aluminum-like metal material without causing welding defects such as spatters or cracks and performing high-speed pulse seam welding. The laser apparatus includes a pulse power source that generates a current signal and a mask signal for masking a fluctuation component included in the current signal, and which supplies a current signal in which a fluctuation component has been masked by the mask signal to a YAG pulsed laser oscillator. In addition, the laser apparatus sets the spot shape of a CW laser light oscillated by a CW laser oscillator to a rhombic streamlined shape, and causes a focus spot of the CW laser light to include a circular focus spot of a pulsed laser light.

3 Claims, 4 Drawing Sheets

LASER APPARATUS AND MANUFACTURING METHOD OF A BATTERY

FIELD OF THE INVENTION

The present invention relates to a laser apparatus that focuses a superimposed laser light in which a pulsed laser light is superimposed with a continuous wave laser light (CW laser light) at a processing point, and a method of manufacturing a battery using the laser apparatus.

BACKGROUND OF THE INVENTION

Conventionally, sealing of an aluminum-like metal container used in a lithium battery for a mobile device has been performed by pulse seam welding in which a YAG pulsed laser light is irradiated along a junction line between an opening of the container and a sealing member fitted into the opening. More specifically, when sealing an aluminum-like metal container, a YAG pulsed laser light is irradiated to each processing point in a three-level waveform. That is, first, cutting is performed with a high-speed, high-peak pulsed laser, and when the aluminum-like metal material starts to melt, laser power is immediately suppressed to around half to perform final welding. Subsequently, laser power is further reduced to around half to perform annealing in order to relieve residual stress. Welding is performed in this manner using the three-level waveform YAG pulsed laser light because the aluminum-like metal material has a high reflectance and a high thermal conductivity yet a low melting point, and is further characterized by a rapid increase in laser absorptance once melted.

However, while usable for sealing a lithium battery for a mobile device, the three-level waveform YAG pulsed laser light cannot be used for sealing a lithium battery for a hybrid vehicle. This is because while sufficient joint strength can be achieved with a penetration amount of around 0.2 mm in the case of a lithium battery for a mobile device, a penetration amount of around 0.5 mm is required in the case of a large-size lithium battery for a hybrid vehicle, and increasing laser power so as to satisfy such a deep penetration creates spatters.

Meanwhile, conventionally, the use of a superimposed laser light in which a pulsed laser light is superimposed with a CW laser light in pulse seam welding has been proposed (for example, refer to Japanese Patent Laid-Open No. 2004-337881) According to the pulse seam welding using a superimposed laser light, since a pulsed laser light can be irradiated to a processing point that is in a state in which laser light is easily penetratable due to preheating by a CW component, spatterless welding can be performed. A conventional laser apparatus that generates the aforementioned superimposed laser light will now be described.

FIG. 6 is a schematic diagram showing a general configuration of a conventional laser apparatus that generates a superimposed laser light in which a pulsed laser light is superimposed with a CW laser light. The laser apparatus includes a YAG pulsed laser oscillator 101 that oscillates a pulsed laser light having an oscillation wavelength of 1064 nm. A pulsed laser light oscillated by the oscillator 101 passes through an SI optical fiber 102 and is incident to a collimator lens 103. The pulsed laser light collimated by the collimator lens 103 is incident to a dichroic mirror 104.

In addition, the laser apparatus includes a high-output semiconductor laser 105 that oscillates a CW laser light. The CW laser light oscillated by the high-output semiconductor laser 105 is incident to the dichroic mirror 104.

The dichroic mirror 104 superimposes the pulsed laser light from the collimator lens 103 with the CW laser light from the high-output semiconductor laser 105 to generate a superimposed laser light, and causes the superimposed laser light to be incident to a focusing lens 106. The focusing lens 106 focuses the pulsed laser light and the CW laser light superimposed by the dichroic mirror 104 at a processing point.

As shown in FIG. 6, a focus spot 107 of the pulsed laser light having passed through the optical fiber 102 takes a circular shape similar to a core shape of the optical fiber 102. On the other hand, a focus spot 108 of the CW laser light oscillated by the high-output semiconductor laser 105 generally does not take a circular shape, and takes a linear shape as shown in FIG. 6.

When performing pulse seam welding using a superimposed laser light in which the circular-shaped pulsed laser light is superimposed with the linear-shaped pulsed laser light, the major axis direction of the focus spot 108 of the CW laser light is set in a direction aligned with a junction line and the superimposed laser light is relatively moved along a longitudinal direction of the junction line. Accordingly, since the pulsed laser light can be irradiated on a processing point that is in a state in which laser light is easily penetratable due to preheating by a CW component, spatterless welding can be performed.

However, while the superimposed laser light in which the circular-shaped pulsed laser light is superimposed with the linear-shaped CW laser light achieves spatterless welding that satisfies a desired penetration amount when sealing an NiH battery for a hybrid vehicle which uses a steel-like metal container, the superimposed laser light is unable to satisfy a desired penetration amount when sealing a lithium battery for a hybrid car which uses an aluminum-like metal container because heat escapes to the surroundings from a tip of a linear-shaped CW component. In addition, increasing the CW component in order to attain a preheating effect causes deformation of the container and subsequently widens a gap between a wall surface of an opening of the container and the sealing member, which in turn creates a disadvantage that laser light leaks to an inner electrode and damages the inner electrode.

As seen, the conventional laser welding technique is not capable of performing pulse seam welding of thick aluminum-like metal material such as the sealing of an aluminum-like metal container used in a lithium battery for a hybrid vehicle.

Furthermore, the sealing of an aluminum-like metal container used in a lithium battery for a hybrid vehicle has the following disadvantages. Firstly, with aluminum-like metal material, since laser absorption factor varies significantly due to minute differences in surface conditions such as scratches, coarseness and staining, the penetration amount also varies significantly due to surface conditions. On the other hand, during the sealing of an aluminum-like metal container, when laser light penetrates the sealing member, a spatter occurs from the penetrated portion and, in turn, causes a short circuit. Since a short circuit in a lithium battery has a risk of causing a fire, the penetration amount must be controlled so as to prevent the laser light from penetrating the sealing member. Therefore, it is necessary to stabilize the penetration amount even when surface conditions vary.

Moreover, since aluminum-like metal material has a high reflectance and, in particular, has only a laser absorption factor of 7% with respect to YAG pulsed laser light, pulse seam welding of an aluminum-like metal container requires a YAG pulsed laser light in the kW range. Therefore, in order to supply power in excess of 30 kW to an excitation light source to obtain a kW-range YAG pulsed laser light, output current in the order of several hundred amperes must be controlled at the power source for the excitation light source. Meanwhile, since a lithium battery for a hybrid vehicle is about ten times as large as a lithium battery for a mobile device, an increased welding speed is required from a productivity perspective. Increasing welding speed requires reducing a pulse width (welding time) of a pulsed laser light, which in turn requires that a pulse be raised at high speed. Therefore, at the power source for the excitation light source, it is necessary to control the output current in the order of several hundred amperes to be supplied to the excitation light source to a current signal having a high-speed rise and a short pulse width.

However, with a dropper power source, raising a current signal in the order of several hundred amperes at high speed significantly increases equipment size. Therefore, the dropper power source is unsuitable for a laser apparatus to be used to weld aluminum-like metal material. On the other hand, with a chopper/inverter power source that controls output current by switching an internal switch element, clock synchronization is essential. Therefore, a jitter in the order of several ten μs occurs in a chopping clock period signal (drive signal) that drives the switch element and, consequently, a jitter in the order of several ten μs also occurs in the output current. As a result, since reducing the pulse width of a current signal to be supplied to the excitation light source increases the proportion of a jitter component (fluctuation component) and causes a significant power fluctuation in the pulsed laser light, a stable penetration amount cannot be achieved. For example, when the pulse width of the current signal to be supplied to the excitation light source is set to 0.3 ms, a jitter component of 30 μs causes a 10% power fluctuation and penetration amounts also vary by about 10%.

Therefore, with a general dropper power source or a chopper/inverter power source, pulse reduction of a current signal to be supplied to an excitation light source could not be achieved. Consequently, a YAG pulsed laser light whose pulse width is 2 ms or more has been generally used to seal a lithium battery for a mobile device.

In addition, since the pulse width is set to 2 ms or higher, the energy of the YAG pulsed laser light increases. Thus, conventionally, a GI optical fiber could not be used and an SI optical fiber has been used. This is because, with a GI optical fiber, a spatter occurs from an edge surface of a laser exit aperture when the energy of the laser light is increased. However, an SI optical fiber is prone to damages due to on-site adherence of dust and the like during fiber exchange.

Moreover, an SI optical fiber has a small aperture of 0.6 mm to 0.4 mm. Meanwhile, since a lithium battery for a hybrid car has a large size, as far as the fitting relationship between the opening of the container and the sealing member is concerned, the gap between a wall surface of the opening and the sealing member is larger in comparison to a lithium battery for a mobile device. Therefore, when using an SI optical fiber with a small aperture, a wide spot diameter must be set for the pulsed laser light. As a result, power transmissibility to a processing point is reduced in comparison to a wide-aperture GI optical fiber.

DISCLOSURE OF THE INVENTION

The present invention is made in consideration with the disadvantages described above, and an object of the invention is to provide a laser apparatus capable of achieving deep penetration into an aluminum-like metal material without causing welding defects such as spatters and cracks as well as high-speed pulse seam welding, and a manufacturing method of a battery using the laser apparatus.

In order to achieve the object described above, a laser apparatus according to the present invention includes: a first laser oscillator that oscillates a pulsed laser light; a pulse power source that generates a current signal and a mask signal for masking a fluctuation component included in the current signal and which supplies the current signal whose fluctuation component is masked by the mask signal to the first laser oscillator; a second laser oscillator that oscillates a continuous wave laser light; a first optical system that generates a superimposed laser light by superimposing the pulsed laser light with the continuous wave laser light and which focuses the superimposed laser light; a second optical system that sets a shape of a focus spot of the pulsed laser light to a circular shape; and a third optical system that sets a shape of a focus spot of the continuous wave laser light to a rhombic streamlined shape, wherein the first optical system forms a focus spot for the superimposed laser light in which the circular-shaped focus spot for the pulsed laser light is included in the focus spot for the continuous wave laser light having a rhombic streamlined shape.

In addition, according to the present invention, the rise time of the pulsed laser light is 0.1 ms or less and the pulse width of the pulsed laser light is 0.4 ms or less.

Furthermore, according to the present invention, the pulse power source includes: a chopper/inverter power source that generates the current signal; a switch element that receives the current signal from the chopper/inverter power source and supplies the current signal to the first laser oscillator; and a mask circuit that generates the mask signal and suspends supplying of the current signal to the first laser oscillator by the switch element.

Moreover, in a battery manufacturing method according to the present invention, when sealing a container of a battery, superimposed laser light generated by the laser apparatus is irradiated along a junction line between an opening of the container and a sealing member fitted into the opening in order to weld the sealing member to the opening of the container.

According to a preferred embodiment of the present invention, since a current signal whose fluctuation component is masked is supplied to the first laser oscillator, even when a high-speed (high-speed rise, short pulse width), high-peak pulsed laser light is oscillated by the first laser oscillator, power fluctuation of the pulsed laser light can be suppressed. Therefore, a reduction in the welding speed and stabilization of the penetration amount can be achieved. In addition, by oscillating a high-speed, high-peak pulsed laser light from the first laser oscillator, a penetration amount can be stabilized even when surface conditions of an aluminum-like metal material that is the processing object fluctuate.

Furthermore, by arranging a focus spot of CW laser light (continuous wave laser light) to take a rhombic streamlined shape, even when performing pulse seam welding on an aluminum-like metal material, a processing point can be preheated efficiently without having to increase the power of the CW laser light. Consequently, spatterless welding can be achieved. Moreover, since a focus spot of pulsed laser light is internally included in a focus spot of CW laser light, penetration of minute keyholes occurs instantaneously. In addition, since slow cooling of a processing point is performed by the CW laser light after welding, rapid heat change can be suppressed to prevent cracks from occurring.

Consequently, deep penetration into aluminum-like metal material can be achieved without causing welding defects such as spatters or cracks and, at the same time, high-speed pulse seam welding can be achieved. In addition, a penetration amount can be stabilized and a desired penetration amount can be satisfied. Therefore, it is now possible to achieve pulse seam welding of thick aluminum-like metal material such as the sealing of an aluminum-like metal container used in a lithium battery for a hybrid vehicle.

Furthermore, by oscillating a high-speed, high-peak pulsed laser light from the first laser oscillator, the energy per pulse can be kept low. Therefore, a GI optical fiber can now be used because only fine powdery spatters in the order of several ten μ which resemble smoke occur from an edge surface of a laser exit aperture even when using the GI optical fiber. Consequently, by using a GI optical fiber, a larger aperture can be used as compared to an SI optical fiber and power transmissibility to a processing point can be improved,

DESCRIPTION OF THE EMBODIMENT

Figure 1:
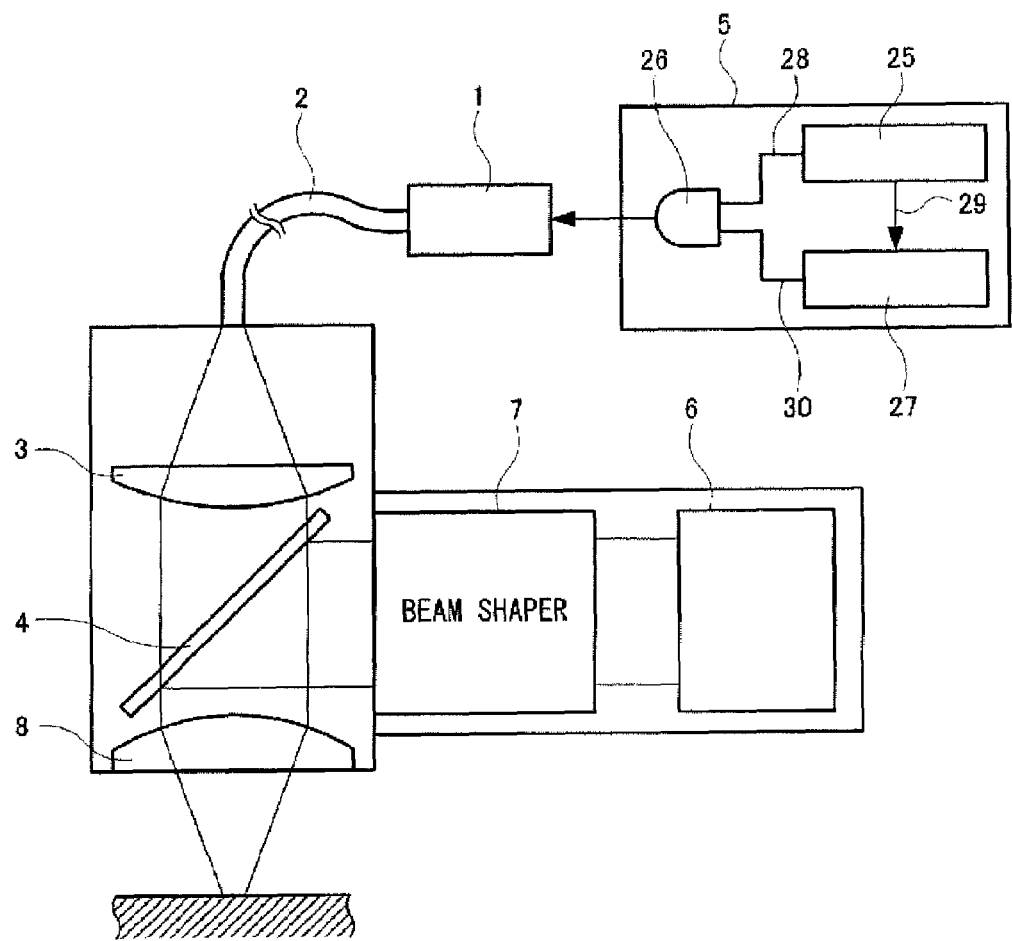
FIG. 1 is a schematic diagram showing an example of a general configuration of a laser apparatus according to an embodiment of the present invention.

An embodiment of the present invention will now be described with reference to the drawings. FIG. 1 is a schematic diagram showing an example of a general configuration of a laser apparatus according to an embodiment of the present invention. The laser apparatus includes a YAG pulsed laser oscillator (first laser oscillator) 1 that oscillates a pulsed laser light with a wavelength of 1064 nm. A pulsed laser light oscillated by the oscillator 1 passes through a GI optical fiber 2 with a core diameter of 0.8 mm and is incident to a collimator lens 3. Subsequently, the pulsed laser light collimated by the collimator lens 3 is incident to a dichroic mirror 4.

In addition, although not shown, a YAG rod and an excitation light source are installed into the YAG pulsed laser oscillator 1. A pulse power source 5 for the excitation light source generates a current signal for causing the YAG pulsed laser oscillator 1 to oscillate a pulsed laser light of a desired pulse width and a peak power determined in advance in correspondence with a processing object, and at the same time, generates a mask signal for masking a fluctuation component (jitter component) included in the current signal. The pulse power source 5 supplies the current signal in which the jitter component has been masked by the mask signal to the excitation light source of the YAG pulsed laser oscillator 1.

As shown, by supplying a current signal whose jitter component has been masked to the excitation light source of the YAG pulsed laser oscillator 1, even when a high-speed (high-speed rise, short pulse width), high-peak pulsed laser light is oscillated by the YAG pulsed laser oscillator 1, power fluctuation of the pulsed laser light can be suppressed. Consequently, a reduction in welding time and stabilization of a penetration amount can be achieved. In addition, by oscillating a high-speed, high-peak pulsed laser light by the YAG pulsed laser oscillator 1, a penetration amount can be stabilized even when surface conditions of an aluminum-like metal material that is the processing object fluctuate.

When sealing an aluminum-like metal container used in a lithium battery for a hybrid vehicle, a pulsed laser light with a rise time of 0.1 ms or less, a pulse width of 0.4 ms or less and a peak power of 5 kW or more is oscillated by the YAG pulsed laser oscillator 1. More preferably, the pulse width is set to 0.3 ms. By sealing a lithium battery for a hybrid vehicle under the conditions described above, pulse seam welding that satisfies a desired penetration amount (0.5 mm) can be achieved.

The laser apparatus includes a CW laser oscillator (second laser oscillator) 6 that oscillates a CW laser light (continuous wave laser light) with a wavelength of 915 nm. A CW laser light oscillated by the oscillator 6 passes through a beam shaper 7 and is incident to the dichroic mirror 4.

The dichroic mirror 4 superimposes a pulsed laser light from the collimator lens 3 with a CW laser light from the beam shaper 7. A focusing lens 8 focuses the pulsed laser light and the CW laser light superimposed by the dichroic mirror 4 at a processing point.

Figure 2:
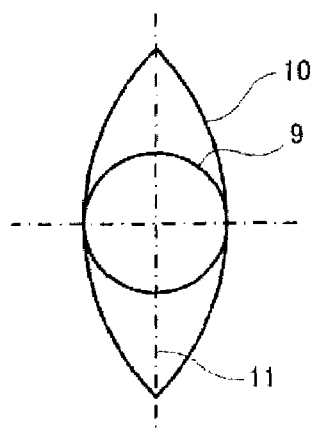
FIG. 2 is a schematic diagram showing examples of shapes of focus spots of a pulsed laser light and a CW laser light according to the embodiment of the present invention.

As shown in FIG. 2, a focus spot 9 of the pulsed laser light having passed through the optical fiber 2 takes a circular shape similar to a core shape of the optical fiber 2. Meanwhile, a focus spot 10 of the CW laser light having passed through the beam shaper 7 takes a rhombic streamlined shape instead of a linear or a rectangular shape. The focus spot 9 of the pulsed laser light is internally included in the focus spot 10 of the CW laser light. When performing pulse seam welding using such a superimposed laser light, the major axis direction of the focus spot 10 of the CW laser light is set in a direction aligned with a junction line 11 and the superimposed laser light is relatively moved along a longitudinal direction of the junction line 11.

In this manner, by arranging a focus spot of CW laser light to take a rhombic streamlined shape, spatterless welding can be achieved because a processing point can be preheated efficiently without having to increase the power of the CW laser light even when performing pulse seam welding on an aluminum-like metal material. In addition, as shown in FIG. 2, it is preferable to arrange an arc of the focus spot 9 of pulsed laser light so as to be tangent to an arc of the focus spot 10 of CW laser light. In other words, with such an arrangement, since the focus spot 9 of pulsed laser light is superimposed on the center of the focus spot 10 where the laser power of the CW laser light is maximum, penetration of minute keyholes occurs instantaneously.

As described above, the laser apparatus according to the present embodiment includes the dichroic mirror 4 and the focusing lens 8 as a first optical system which generates a superimposed laser light by superimposing a pulsed laser light with a CW laser light and which focuses the superimposed laser light. In addition, the laser apparatus includes the optical fiber 2, the collimator lens 3 and the focusing lens 8 as a second optical system which sets the shape of a focus spot of pulsed laser light to a circular shape.

Figure 3A:
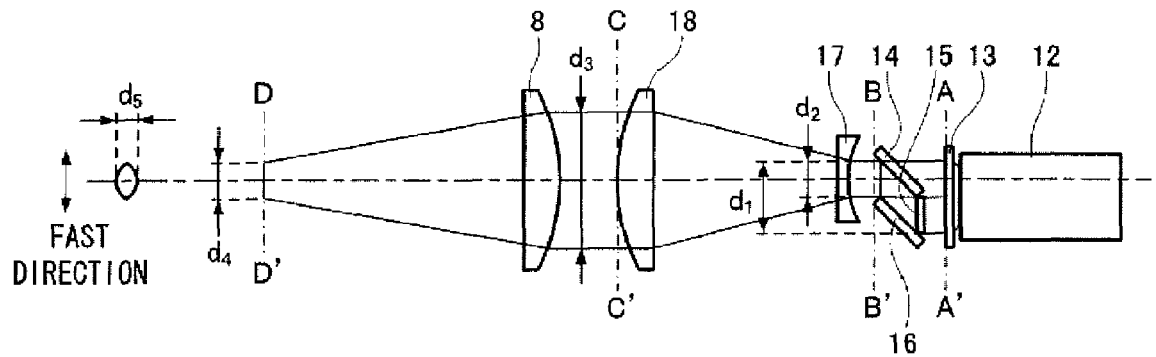
FIG. 3A is a schematic overhead view of examples of a CW laser oscillator and a beam shaper according to the embodiment of the present invention.
Figure 3B:
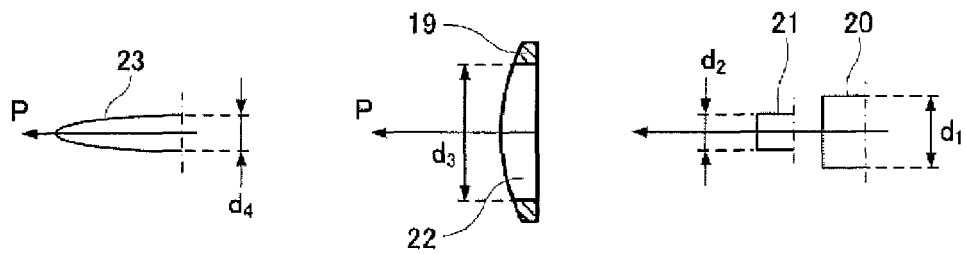
FIG. 3B is a diagram showing an example of a power distribution of a CW laser light in a FAST direction according to the embodiment of the present invention.
Figure 3C:
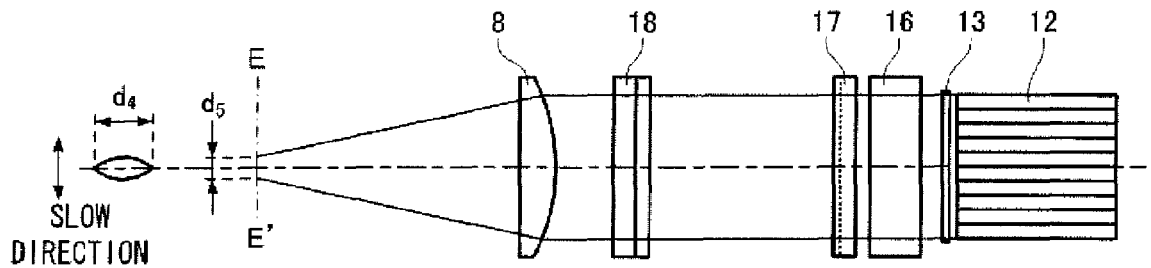
FIG. 3C is a schematic lateral view of examples of the CW laser oscillator and the beam shaper according to the embodiment of the present invention.
Figure 3D:
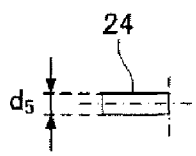
FIG. 3D is a diagram showing an example of a power distribution of a CW laser light in a SLOW direction according to the embodiment of the present invention.

Next, a detailed description of the beam shaper 7 will be given with reference to FIGS. 3A to 3D. FIG. 3A shows a schematic overhead view of the CW laser oscillator 6 and the beam shaper 7. FIG. 3B shows a power distribution of a CW laser light in a FAST direction. FIG. 3C shows a schematic lateral view of the CW laser oscillator 6 and the beam shaper 7. FIG. 3D shows a power distribution of a CW laser light in a SLOW direction.

First, a power distribution of a CW laser light in a FAST direction will be described. The CW laser oscillator 6 is constituted by an LD stack in which is laminated a plurality of semiconductor laser array bars 12. In this case, semiconductor laser array bars 12 are used in which a plurality of semiconductor laser emitters is aligned in a FAST direction. Furthermore, while a case will be described where a FAST lens 13 is mounted anteriorly to the laser exit aperture of the LD stack, when using an LD stack not provided with a FAST lens, providing the beam shaper 7 with a FAST lens shall suffice.

As shown in FIGS. 3A and 3B, a FAST-directional width of a CW laser light outputted from the semiconductor laser array bar 12 is collimated to "d1" by the FAST lens 13. Accordingly, a FAST-direction power distribution (the power distribution of the A-A' section shown in FIG. 3A) 20 of the CW laser light incident to the beam shaper 7 takes a top hat shape whose width is d1.

A portion of the CW laser light incident to the beam shaper 7 is directly incident to a polarizing beam splitter (PBS) 14 A plane of vibration of the remaining portion is first polarized in a direction parallel to the paper plane by a ½ wavelength plate 15 and is subsequently bent 90 degrees by a 45-degree mirror 16 before being incident to the PBS 14. The PBS 14 combines the directly incident light and the light incident via the ½ wavelength plate 15 and the 45-degree mirror 16. The FAST-direction power distribution (the power distribution of the B-B' section shown in FIG. 3A) 21 of the CW laser light after combination takes a top hat shape whose width is d2 (<d1). The CW laser light after combination is incident to a concave cylindrical lens 17. The concave cylindrical lens 17 with a focal length of f1 and a convex cylindrical lens 18 with a focal length of f2 constitute an expander. The expander expands a FAST-directional width of the CW laser light. The CW laser light after expansion is incident to the aforementioned focusing lens 8 via the aforementioned dichroic mirror 4.

In this case, an expansion ratio (|f2/f1|) of the expander constituted by the concave cylindrical lens 17 and the convex cylindrical lens 18 is set to 2.5 or higher. In addition, a concave cylindrical lens 17 having a large curvature radius and a focal length f1 ranging from −25 mm to −30 mm is used. According to the configuration described above, a FAST-direction power distribution (the power distribution of the C-C' section shown in FIG. 3A) 22 of the CW laser light having passed through the expander takes a hill-like shape whose width is d3 (>d2) In other words, with the CW laser light having passed through the expander, a portion corresponding to the width d3 (>d2) that is the portion excluding an expanded portion 19 due to a spherical aberration of the expander is collimated. When a CW laser light in this mode is focused by the focusing lens 8 that is devoid of the aforementioned spherical aberration, a FAST-direction power distribution (the power distribution of the D-D' section shown in FIG. 3A) 23 of the CW laser light at a processing point takes a bell shape with a maximum width of d4 (<d3).

On the other hand, as shown in FIGS. 3C and 3D, a power distribution of the CW laser light in a SLOW direction is not affected by the spherical aberration of the expander constituted by the concave cylindrical lens 17 and the convex cylindrical lens 18. A SLOW-direction power distribution (the power distribution of the E-E' section shown in FIG. 3C) 24 of the CW laser light focused at the processing point by the focusing lens 8 takes a rectangular shape with a width of d5. Therefore, a shape of the focus spot (a region whose luminance is higher than others) 10 of the CW laser light at a processing point is determined by the power distribution in the FAST direction and takes a rhombic streamlined shape. In other words, since the laser exit aperture of the LD stack is rectangular, the spot shape at a processing point takes a rectangular shape if there are no spherical aberrations. In contrast, when an expander is provided such as in the present embodiment, the laser power at corner portions of a rectangular spot decreases. Therefore, the spot shape takes a rhombic streamlined shape in which the portions with low laser power are darkened.

Settings for a preferred specific example are: d1=10 mm; d2=2 mm; f1=−25 mm; and f2=100 mm. Such settings approximately result in d3=20 mm, d4=2 mm, and d5=0.6 mm.

As described above, the laser apparatus according to the present embodiment includes the FAST lens 13, the beam shaper 7 and the focusing lens 8 as a third optical system which sets the shape of a focus spot of CW laser light to a rhombic streamlined shape As shown, according to the present embodiment, since a focus spot of CW laser light can be arranged to take a rhombic streamlined shape without having to use a mask, LD power can be efficiently transmitted to a processing point.

Next, the pulse power source 5 will be described in detail. As shown in FIG. 1, the pulse power source S includes an ordinary chopper/inverter power source 25, a GTO thyristor (switch element) 26 that receives a current signal 28 from the chopper/inverter power source 25 and supplies the current signal to the YAG pulsed laser oscillator 1, and a mask circuit 27 that controls a gate of the GTO thyristor 26. when sealing a lithium battery for a hybrid vehicle using the laser apparatus, the chopper/inverter power source 25 generates a current signal for causing the YAG pulsed laser oscillator 1 to oscillate a pulsed laser light with a rise time of 0.1 ms or less, a pulse width of 0.4 ms or less and a peak power of 5 kW or more.

Figure 4:
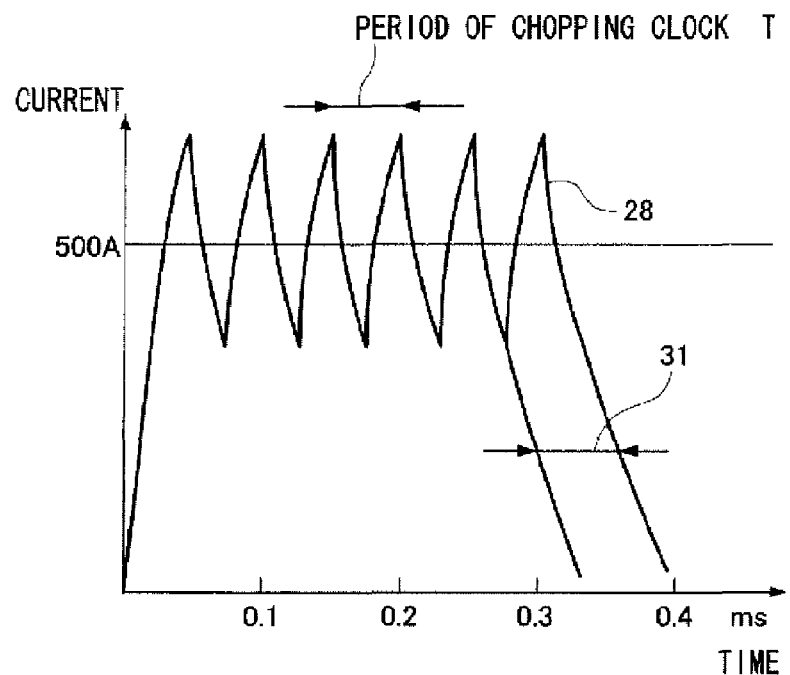
FIG. 4 is a diagram showing an example of a current signal generated by a chopper/inverter power source included in a pulse power source according to the embodiment of the present invention.

However, with a chopper/inverter power source that controls output current by switching an internal switch element, clock synchronization is essential. Therefore, a jitter in the order of several ten µs occurs in a chopping clock period signal (drive signal) that drives the switch element and, consequently, a jitter in the order of several ten µs also occurs in the output current. As a result, since reducing the pulse width of a current signal to be supplied to the excitation light source increases the proportion of a jitter component (fluctuation component), supplying the current signal generated by the chopper/inverter power source without modification to the excitation light source causes significant power fluctuation in the pulsed laser light. Such a power fluctuation prevents a stable penetration amount from being achieved. For example, as shown in FIG. 4, when a current signal 28 with a pulse width of 0.3 ms is generated by the chopper/inverter power source 25, a jitter component 31 of 30 µs is generated. Therefore, when the current signal is supplied without modification to the excitation light source, a 10% power fluctuation occurs in the pulsed laser light and the penetration amount also fluctuates by around 10%. Normally, pulse seam welding for sealing a lithium battery requires that fluctuation in the penetration amount be kept to around 3% (a jitter component of 10 µs or less with respect to a pulse width of 0.3 ms).

Figure 5:
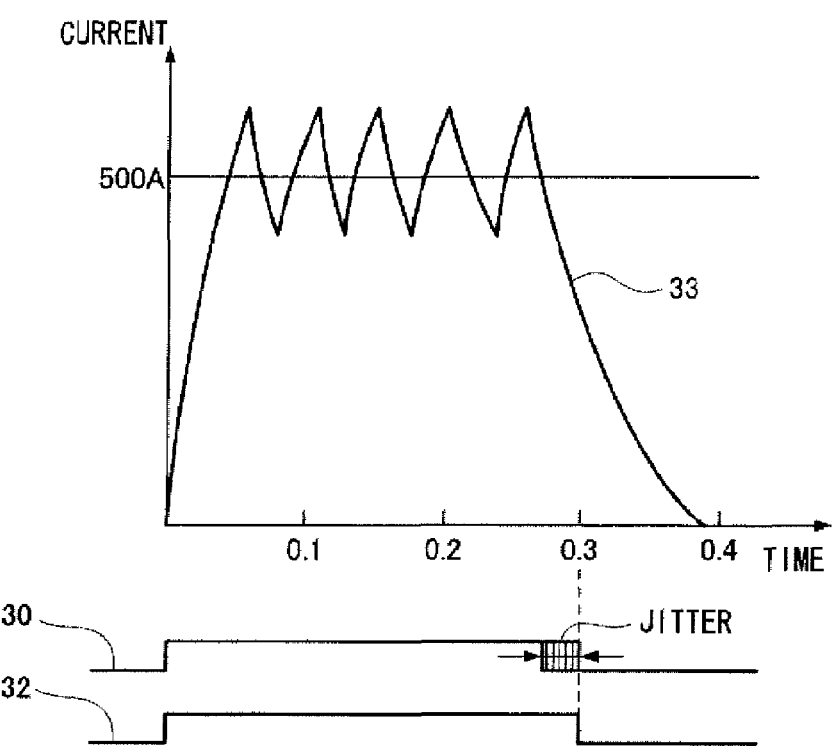
FIG. 5 is a diagram showing an example of a current signal generated by a pulse power source according to the embodiment of the present invention.
Figure 6:
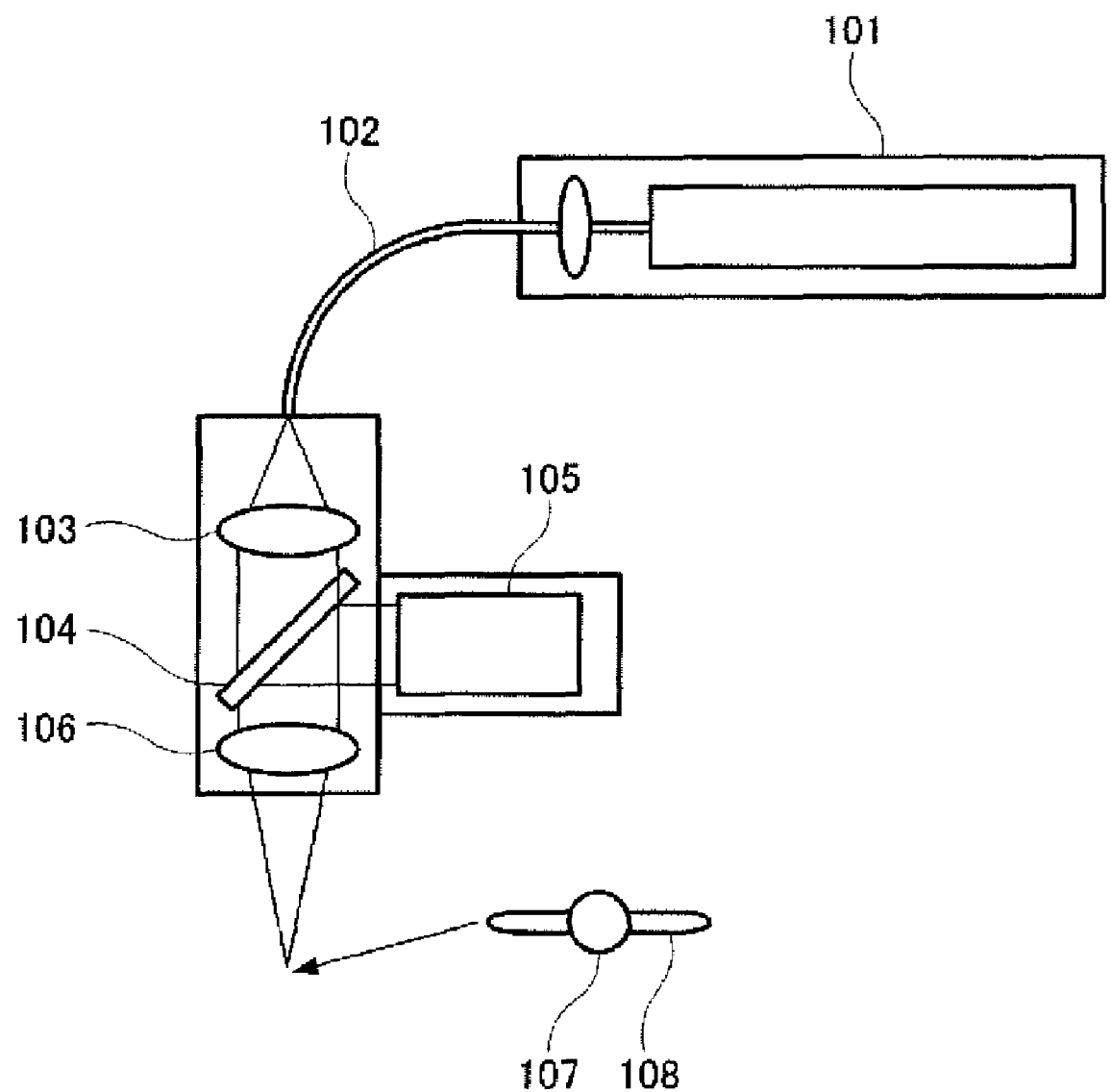
FIG. 6 is a schematic diagram showing a general configuration of a conventional laser apparatus.

In consideration thereof, in the present embodiment, a jitter component is forcibly cut by the GTO thyristor 26 and the mask circuit 27. More specifically, the chopper/inverter power source 25 generates a chopping clock period signal 29 that switches an internal switch element (not shown) and supplies the chopping clock period signal 29 to the mask circuit 27. The mask circuit 27 supplies the chopping clock period signal 29 from the chopper/inverter power source 25 to the gate of the GTO thyristor 26 as a gate drive signal 30. Accordingly, the GTO thyristor 26 performs switching operations in synchronization with the chopping clock period signal 29. In addition, since the chopping clock period signal 29 includes a jitter, the gate drive signal becomes a signal that includes the jitter component. The mask circuit 27 generates a mask signal of a desired pulse width and masks the gate drive signal 30 according to the mask signal. For example, when the pulse width of a current signal to be supplied to the excitation light source is set to 0.3 ms, the mask circuit 27 generates a mask signal 32 with a pulse width of 0.3 ms as shown in FIG. 5. By masking the gate drive signal 30 in this manner, the GTO thyristor 26 turns off when 0.3 ms has elapsed from the start of operation of the GTO thyristor 26, and supplying of the current signal by the GTO thyristor 26 to the YAG laser oscillator 1 is suspended Therefore, a current signal 33 whose jitter component has been masked (cut) can be supplied to the excitation light source of the YAG laser oscillator and the pulse width of the pulsed laser light can be stabilized.

By using the above-described pulse power source 5 and stabilizing the pulse width of a pulsed laser light at 0.4 ms or less, and by using a GI optical fiber with a diameter of 0.8 mm to irradiate a pulsed laser light with an average power of 1 kW on an aluminum-like metal material, a deep penetration can be obtained. For example, when irradiating a pulsed laser light with a pulse width of 0.3 ms and a peak power of 6 kW or, in other words, an energy of 1.8 J on an aluminum-like metal material, a penetration depth of 0.4 mm can be achieved in a spatterless manner at a welding speed of 80 mm/s.

As shown, according to the present embodiment, the emission of a pulsed laser light can be suspended before a spatter occurs. In other words, the pulse width of a pulsed laser light can be controlled at high accuracy by cutting a jitter component. Therefore, the laser energy per shot can be stabilized. While a GTO thyristor has been used in the present embodiment as a switch element, the present invention is not limited to this arrangement.

In addition, without a CW component, when irradiating a high-speed, high-peak pulsed laser light with a rise time of 0.1 ms or less, a pulse width of 0.4 ms or less and a peak power of 5 kW or more, since the rise of the pulsed laser light occurs too rapidly and the peak is too high, even with pure aluminum that is reported to be crack-free, cracks occur at the center of a spot keyhole of a pulsed laser light. In contrast, as is the case with the present embodiment, when irradiating a superimposed laser light in which a circular-shaped pulsed laser light is superimposed with a CW laser light having a rhombic streamlined shape, since slow cooling of a processing point is performed by the CW laser light after welding, rapid heat change is suppressed and cracks can be prevented. Furthermore, according to the pulse seam welding using a superimposed laser light, an overlap ratio of a pulse train can be increased and a crackless, spatterless bead can be formed. Moreover, since the pulse seam welding using the superimposed laser light performs cutting at a high peak, the influence of the surface condition of the aluminum-like metal material is small and welding speeds in excess of 100 mm/s can be attained. In addition, according to the pulse seam welding using a superimposed laser light, since high-speed welding is possible, thermal deformation of a processing object can be suppressed. In addition, according to the pulse seam welding using a superimposed laser light, since a CW laser light is irradiated only on portions necessary for preheating and slow cooling, loss can be kept at a minimum. From the perspective of loss suppression, it is particularly preferable to adjust the length of the major axis of the rhombic streamlined shape to 1.4 to 2 times the length of the minor axis. Moreover, by further increasing the length of the major axis of the rhombic streamlined shape in correspondence with an increase in welding speed, preheating and slow cooling effects can be further enhanced.

In addition, according to the present embodiment, since a high-speed, high-peak pulsed laser light is oscillated, a GI optical fiber can be used. Consequently, since sealing of a lithium battery for a hybrid car which has a large gap between an opening of the container and a sealing member can be achieved without having to increase the spot diameter of a pulsed laser light, power transmissibility to a processing point can be improved.

Furthermore, according to the present embodiment, by arranging the power of a CW laser light to be larger than an average power of a pulsed laser light, beads having smoother surfaces can be formed.

What is claimed is:

1. A laser apparatus comprising:
   a first laser oscillator for oscillating a pulsed laser light;
   a pulse power source for generating a current signal and a mask signal for masking a fluctuation component included in the current signal, and for supplying the current signal whose fluctuation component is masked by the mask signal to the first laser oscillator;
   a second laser oscillator for oscillating a continuous wave laser light;
   a first optical system that generates a superimposed laser light by superimposing the pulsed laser light with the continuous wave laser light, and for focusing the superimposed laser light;
   a second optical system for shaping a focus spot of the pulsed laser light to a circular shape; and
   a third optical system for shaping a focus spot of the continuous wave laser light to a rhombic streamlined shape, wherein
   the first optical system is for forming a focus spot for the superimposed laser light in which the circular-shaped focus spot for the pulsed laser light is included in the rhombic-streamlined-shaped focus spot for the continuous wave laser light;
   the pulse power source comprising:
   a chopper/inverter power source for generating the current signal;
   a switch element for receiving the current signal from the chopper/inverter power source and supplying the current signal to the first laser oscillator; and
   a mask circuit for generating the mask signal and, by the switch element, suspending supplying of the current signal to the first laser oscillator.

2. The laser apparatus according to claim 1, wherein the pulse power source is capable of causing the first laser oscillator to oscillate a pulsed laser light having a rise time of 0.1 ms or less and a pulse width of 0.4 ms or less.

3. A method of sealing a battery casing, said method comprising:

provided a battery container having an opening and a sealing member fitted into the opening, thereby defining a junction line between the container opening and the sealing member; and welding the sealing member to the container by irradiating along the junction line using a superimposed laser light generated by the laser apparatus according to claim 1.

* * * * *